UNITED STATES PATENT OFFICE.

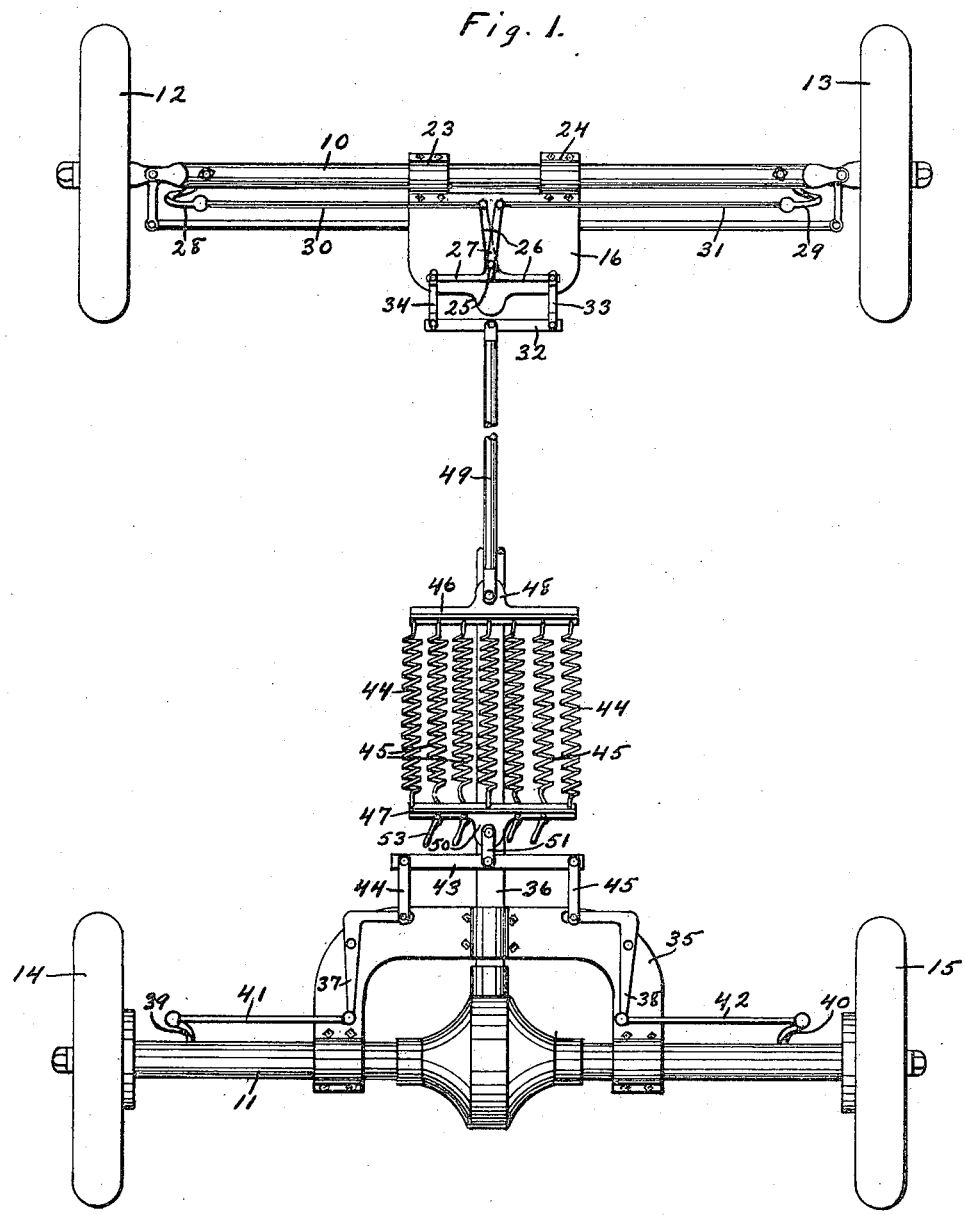

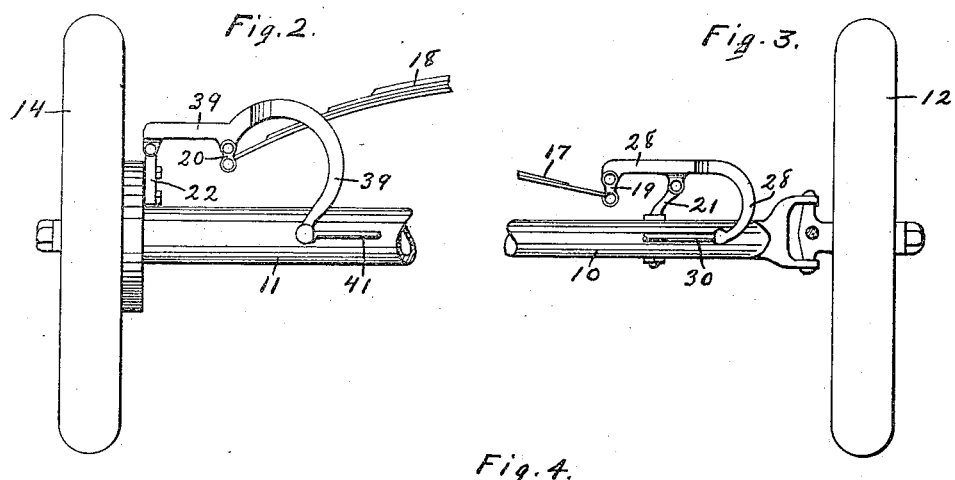
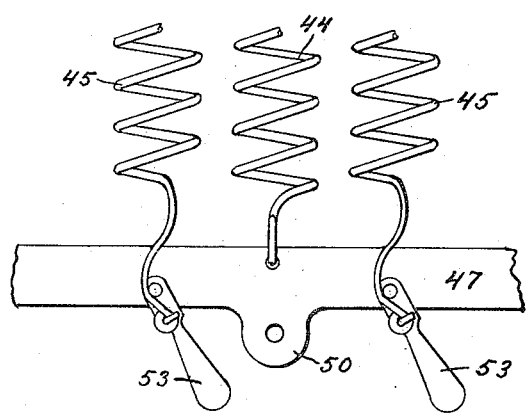
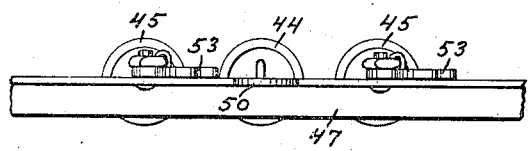

JOHN LOUCIEN CHESNUTT, OF KANSAS CITY, MISSOURI.

AUTOMATIC EQUALIZER FOR VEHICLES.

1,241,494.        Specification of Letters Patent.        Patented Oct. 2, 1917.

Application filed June 23, 1916. Serial No. 105,376.

*To all whom it may concern:*

Be it known that I, JOHN L. CHESNUTT, citizen of the United States of America, and resident of Kansas City, Jackson county, Missouri, have invented a new and useful Automatic Equalizer for Vehicles, of which the following is a specification.

The object of this invention is to provide improved means for equalizing shock between corners of a vehicle.

A further object of this invention is to provide improved means for equalizing the shock between front or rear corners of a vehicle.

A further object of this invention is to provide improved means for equalizing the shock between all corners of a four-wheeled vehicle.

A further object of this invention is to provide improved means for equalizing the rebound between corners of a vehicle.

A further object of this invention is to provide improved means for distributing the shock and rebound between the several corners of a vehicle.

A further object of this invention is to provide improved means for absorbing and dissipating the shock not distributed or transmitted.

A further object of this invention is to provide means for adjusting the shock dissipator to the weight of the load carried by the vehicle, and the correspondingly increased or diminished shock.

A further object of this invention is to provide means for adjusting the shock equalizer, distributer and dissipator to the weight of the load and corresponding shock.

A further object of this invention is to provide means for adjusting the shock equalizer, distributer and dissipator to the weight of the load and corresponding rebound.

A further object of this invention is to provide improved means for increasing the life and usefulness of a vehicle and the various parts thereof by distributing, equalizing, absorbing and reducing the strain of load and road on any given portion or member at all times, and under all conditions.

A further object of this invention is to provide improved means for distributing and decreasing the effect of shock and rebound on the vital parts and members of a vehicle, such as the body springs, axles, motive plant, wheels, and the like, and thereby increasing the life and usefulness of such members.

My invention consists in the construction, arrangement and combination of elements hereinafter set forth, pointed out in my claims and illustrated by the accompanying drawing, in which—

Figure 1 is a bottom plan of the running gears of a motor vehicle equipped with my improvements. Fig. 2 is a front elevation showing one of the rear wheels of the vehicle, a portion of the axle and spring adjacent thereto, and the devices employed by me in connecting said members to carry out my improvement. Fig. 3 is a similar rear elevation including one of the front wheels and parts adjacent thereto. Fig. 4 is a plan of a portion of the yielding pressure devices employed in my device, showing particularly the adjusting means therefor. Fig. 5 is an end elevation of the same.

In the construction of the mechanism as shown the numeral 10 designates the front axle and 11 the rear axle of a vehicle of any suitable construction, said axles being carried respectively by front supporting and steering wheels 12, 13 and rear supporting and traction wheels 14, 15, and carrying a suitable body (not shown). The vehicle is here shown as an automobile, but it is to be understood that my improvements may be applied to other types of vehicles.

In the type of vehicle here shown the body is adapted to be carried by a forward, transversely arranged leaf spring 17 and a rear, transversely arranged leaf spring 18 of common form, which springs normally are pivotally supported at their ends by links or shackles 19, 20 pivoted on brackets 21, 22 fixed to and rising from the end portions of the front and rear axles respectively. To accomplish my purpose I have removed the body springs from the supports above described and substituted other connections to be hereinafter described.

A supporting plate or bracket 16 is secured to the rear side of the front axle 10, as by clamps 23, 24, and projects rearwardly from said axle in a horizontal plane. A vertical stud 25 is formed on or fixed to the plate 16 and bell-crank levers 26, 27 are conjointly pivoted on said stud, each bell-crank lever having an arm extending forwardly toward the axle 10, one above the other, the opposite arms of said levers being extended laterally in opposite directions from the pivot. The bell-crank levers and members connected thereto are here shown as arranged beneath the plate 16 and concealed thereby, but they may be arranged thereabove if desired. Curved levers 28, 29 are pivoted intermediate of their ends on the forward brackets 21, and to the inner ends of said curved levers are pivotally secured the spring shackles or links 19 carrying the forward body spring 17. The opposite or outer ends of the curved levers 28, 29 extend outwardly and downwardly in arcs to approximately the horizontal plane of the axle 10, and are bent, curved or offset rearwardly to avoid said axle. To the lower or outer end portions of the curved levers 28, 29 are pivotally secured outer end portions of links 30, 31, which links have their inner ends pivotally secured to the forwardly extending arms of the bell-crank levers 26, 27 respectively. The connection of the links 30, 31 to the curved levers 28, 29 and to the bell-crank levers 26, 27 preferably is by means of ball-and-socket joints, or other suitable connections permitting freedom of movement required by the horizontal axes of the curved levers and the vertical axes of the bell-crank levers. It is to be understood that the shape and arrangement of the curved levers 28, 29 may be varied as desired, but I prefer to arrange them so far as possible so that they are inconspicuous and concealed by the common parts of the vehicle. Also, if desired, the ends of said levers which are connected to the links 30, 31 may extend inwardly from the pivots supporting said levers.

An evener bar 32 is mounted parallel with and to the rear of the laterally extending arms of the bell-crank levers 26, 27, and has its end portions pivotally connected to said arms by means of links 33, 34 respectively.

A support or bracket 35 is fixed to the rear axle 11 and extends forwardly therefrom, and in this instance I have illustrated this support as arcuate or yoke-shaped in plan and crossing and secured in its central portion to the driving shaft case 36 of the vehicle. Bell-crank levers 37, 38 are pivoted on the support 35 and each of said bell-cranks has an arm extending rearwardly toward the rear axle 11 and another arm extending laterally inwardly toward the median line of the vehicle.

Curved levers 39, 40 are pivoted, preferably at their outer ends, to the supporting brackets 22 of the rear axle, and are provided, intermediate of their ends, with means for pivotally attaching the shackles 20 carrying the rear body spring 18. The inner ends of the levers 39, 40 are curved downwardly to approximately the horizontal plane of the rear axle 11, and are curved, bent or offset forwardly out of the vertical plane of said axle. The inner ends of the curved levers 39, 40 are pivotally connected to outer ends of links 41, 42, which links have their inner ends pivotally connected to the rear end portions of the rearwardly extending arms of the bell-crank levers 37, 38 respectively. The connection of the links 41, 42 to the curved levers 39, 40 and to the bell-crank levers 37, 38 preferably is by means of ball-and-socket joints.

An evener bar 43 is mounted transversely in front of the support 35 and bell-crank levers 37, 38, and has its outer end portions pivotally secured to forward ends of links 44, 45 which extend rearwardly and are connected at their rear ends to the inner ends of the lateral arms of said bell-crank levers.

Yielding pressure devices are interposed between the evener bars 32 and 43, and in this instance comprise a plurality of retractile coil springs 44, 45, connected at their ends to transversely arranged, spaced cross-bars 46, 47. The forward cross-bar 46 has an integral, forwardly extending lug 48 in its central portion, to which is pivotally connected the rear end of a connecting bar 49 which extends forwardly and has its forward end pivotally secured to the central portion of the forward evener bar 32. The rear cross-bar 47 is formed with an integral, rearwardly extending lug 50 in its central portion, to which is pivotally connected the forward end of a connecting bar 51, which extends rearwardly and has its rear end pivotally connected to the rear evener bar 43.

It is to be understood that other yielding pressure devices may be employed between the evener bars if desired, such as pneumatic devices (not shown) similar to those illustrated, described and claimed in my companion application filed June 23, 1916, Serial Number 105,377, to which application reference hereby is made.

It is desirable to provide means for adjusting the strength of the yielding pressure devices to suit the load to be carried by the vehicle, and to this end I have illustrated the springs 45 as detachably connected to the cross-bar at one end, as follows: The end of the spring is pivotally secured to and intermediate of the ends of a lever 53, pivoted or fulcrumed at one end on the cross-bar 47. The free end of the lever 53 may be moved through an arc in one direction to take the tension from the spring 45 and render the same inoperative; and may be moved in the opposite direction to carry the end of said spring past the pivot or fulcrum, as shown in the drawing, to place the spring in operative position. In this position the pivoted end of the spring, which is somewhat curved, passes beyond the right line defined by the axis of the spring and the fulcrum of the lever, and engages a stop such as the projecting end of the fulcrum pivot; and thus, being beyond center, will remain in this position until displaced manually. In this manner one or all of the springs 45 may be placed in operative position to supplement the permanently attached springs 44, as indicated by the weight of the load to be carried at a given time.

It will be observed that a vehicle equipped as above described has the opposite corners of its body yieldingly supported by levers connected across the frame by the links, bell-crank levers and evener bars, in such manner that any jar, jolt, shock or rebound communicated to either corner of the body by the adjacent supporting wheel, will be transmitted and distributed equally to the opposite corner, through an oscillation of said levers and connecting members; and that these evener bars are so connected by the connecting bars and interposed yielding pressure devices as to transmit and distribute such jar, jolt, shock or rebound equally to all four corners of the vehicle. In this manner the accompanying strain is equally distributed to all four corners of the vehicle and reduced and minimized at the corner which would naturally undergo the severe strain and shock. In addition the shock, strain and reactional rebound are diminished, reduced and absorbed to greater or less extent by the action of the yielding pressure devices. By the use of this equalizing mechanism the jerky motion of the body due to travel over rough roads is transformed into a wavy, undulating motion, which is of particular advantage in the case of a light vehicle having comparatively short wheel base, not only with respect to the comfort of the passengers but also with respect to the wear and tear on the vehicle. In this way the life of the various parts and members of the vehicle is prolonged by distributing and absorbing and equalizing the unusual and undue shocks which they would otherwise receive in use.

With respect to the mounting of the bell-crank levers 26, 27, 37 and 38, the pivots of said levers preferably are moved away from the angles thereof in such manner as to increase the leverage of the longitudinally extending arms thereof, thus adding to the tendency of said members to return to normal positions after oscillation in the operation as above described.

If desired other connections and arrangements may be employed for the various levers, bell-cranks and connecting devices, without departing from the spirit of my invention, and I do not desire to be understood as limiting myself to the precise construction and arrangement herein shown and described. For instance, the bell-crank levers may be fulcrumed on the body of the vehicle rather than on the axles, and the arrangement of the links and yielding pressure devices be varied to suit such construction. The connections may also be varied to attach the equalizing device to vehicles having other types of springs than those shown; or if desired, the body springs may be dispensed with, and the vehicle body be supported directly on levers corresponding to the curved levers 28, 29, 39 and 40.

I claim as my invention—

1. A device of the class described, comprising a support, a device to be carried thereby, two pairs of levers fulcrumed on said support and provided with connections for supporting said device, evener bars spaced apart, each of said evener bars being provided with spaced pivotal connections to a pair of said levers, and yielding pressure devices interposed between said evener bars.

2. A device of the class described, comprising a support, a device to be carried thereby, levers arranged in forward and rear pairs and fulcrumed on said support and provided with connections for supporting said device, evener bars spaced apart and pivotally connected respectively to the forward and rear pair of lever devices, and yielding pressure devices interposed between said evener bars, whereby shock is equalized and distributed between the four corners of said device.

3. A device of the class described, comprising a support, a lever fulcrumed adjacent each corner of said support and provided with connections for supporting said device, evener bars spaced apart, each of said evener bars being provided with spaced pivotal connections to two of said levers, and yielding pressure devices interposed between said evener bars and connected thereto intermediate of said spaced pivotal connections, whereby shock and rebound communicated from said support are equalized and distributed to the four corners of said device.

4. A device of the class described, comprising a support, a device to be carried thereby, levers fulcrumed on said support and provided with connections for supporting said device, bell-crank levers mounted for oscillation, pivotal connections between said levers and bell-crank levers, evener bars spaced apart and pivotally connected to said bell-crank levers, and yielding pressure devices between said evener bars.

5. A device of the class described, comprising a support, a device to be carried thereby, levers arranged in forward and rear pairs and fulcrumed on said support and provided with connections for supporting said device, transversely arranged evener bars spaced apart and pivotally connected respectively to forward and rear pairs of said levers, and retractile springs interposed between said evener bars.

6. A device of the class described, comprising a support, a device to be carried thereby, levers fulcrumed on said support and provided with connections for supporting said device, evener bars spaced apart and pivotally connected to opposite pairs of said levers, and yielding pressure devices interposed between and connecting said evener bars, the connections of some of said yielding pressure devices to said evener bars being adapted for manual movement to inoperative position.

7. A device of the class described, comprising a support, a device to be carried thereby, levers fulcrumed on said support and provided with means for supporting said device, bell-crank levers mounted for oscillation and pivotally connected to said lever devices, evener bars spaced apart and pivotally connected to said bell-crank levers, and retractile coil springs interposed between said evener bars.

8. The combination, with a vehicle having axles, supporting wheels thereon, and a body to be carried by said axles, of levers fulcrumed on end portions of said axles, connections between said levers and the vehicle body, bell-crank levers mounted for oscillation, pivotal connections between each of said supporting levers and a bell-crank lever, evener bars spaced apart, pivotal connections between each evener bar and a pair of bell-crank levers, and yielding pressure devices interposed between and connecting said evener bars.

Signed by me at Kansas City, Missouri, this fifteenth day of June, 1916.

JOHN LOUCIEN CHESNUTT.

Witnesses:
JOHN R. GARRISON,
A. J. ALBERG.

Copies of this patent may be obtained for five cents each, by addressing the "Commissioner of Patents, Washington, D. C."